United States Patent [19]
Ashfield

[11] 3,834,498
[45] Sept. 10, 1974

[54] VEHICLE BRAKING BY GEARING LOCK UP CLUTCHES

[75] Inventor: Herbert Edward Ashfield, Meltham, England

[73] Assignee: David Brown Tractors Limited, Huddersfield, England

[22] Filed: Oct. 4, 1973

[21] Appl. No.: 407,893

Related U.S. Application Data
[63] Continuation-in-part of Ser. No. 117,553, Feb. 22, 1971, abandoned.

[30] Foreign Application Priority Data
Feb. 28, 1970  Great Britain ..................... 9788/70

[52] U.S. Cl. .............. 192/4 A, 180/6.2, 192/113 B, 74/785
[51] Int. Cl. ...................... F16h 57/10, B60k 29/02
[58] Field of Search ........... 74/785, 411.5; 192/4 A, 192/4 C, 4 R; 180/6.2

[56] References Cited
UNITED STATES PATENTS
2,865,232  12/1958  Nardone .............................. 74/785
3,463,278  8/1969  Broeker et al. ..................... 192/4 R
3,581,600  6/1971  Holderman ....................... 180/6.2 X

*Primary Examiner*—Benjamin W. Wyche
*Attorney, Agent, or Firm*—Norris & Bateman

[57] ABSTRACT

A drive control system for a vehicle such as an agricultural tractor includes disc braking means for the vehicle's final drive transmission having co-axial input and output shafts drivably connected by epicyclic gearing including a non-rotatable reaction member in which two mutually engagable elements of the braking means are carried by respective members of the epicyclic gearing which are rotatable at different speeds. This enables the output member to be brought to rest without transmitting vibrations to the final drive casing due to neither of the mutually engagable elements of the braking means being connected to the casing. Associated with the braking means is an arrangement for lubricating the brake disc space during non-braking periods.

10 Claims, 3 Drawing Figures

VEHICLE BRAKING BY GEARING LOCK UP CLUTCHES

This is a continuation-in-part of Ser. No. 117,553 filed Feb. 22, 1971 for Braking Means, and now abandoned.

BACKGROUND AND SUMMARY OF INVENTION

This invention relates to drive control for vehicles of the type wherein power is transmitted from the engine to the final drive mainly under relatively low speed high torque conditions of operation, as in agricultural tractors, and particularly to special braking means in the final drive assemblies.

It is known to include a disc brake in the final drive assembly of a vehicle transmission. Such a brake normally comprises two sets of interleaved discs running in oil which can be releasably clamped together in frictional engagement by hydraulic means, one set of said discs being carried by the final drive casing and the other set being carried by a rotating member of the transmission. This arrangement differs from a conventional multi-plate clutch in being designed to absorb high torque at relatively low speeds.

However, with this known braking arrangement, vibrations are set up within the brake just before the vehicle is brought to rest due to the change from dynamic to static friction coefficients. These vibrations and the resulting unpleasant noise are largely overcome by the use of a special oil, known as "anti-squawk" oil, containing an anti-vibration additive.

The major object of the present invention is to provide a vehicle drive control system incorporating a substantially vibration-free transmission disc brake construction and arrangement which does not require a special oil.

A further object of the invention is to provide novel vehicle drive control having braking means for a transmission which includes an input member, an output member and a non-rotatable reaction member co-axial with one another, the input and output members being rotatable simultaneously at different speeds, and wherein one braking element is carried by the input member and another braking element is engagable with said one braking element and carried by the output member. A related object is the association of the foregiong braking means with a lubrication system for non-braking periods of operation.

PREFERRED EMBODIMENTS

The invention will be described in its preferred embodiment wherein it is incorporated in an agricultural tractor vehicle and special braking controls are provided in the two final drives.

Figure 1:
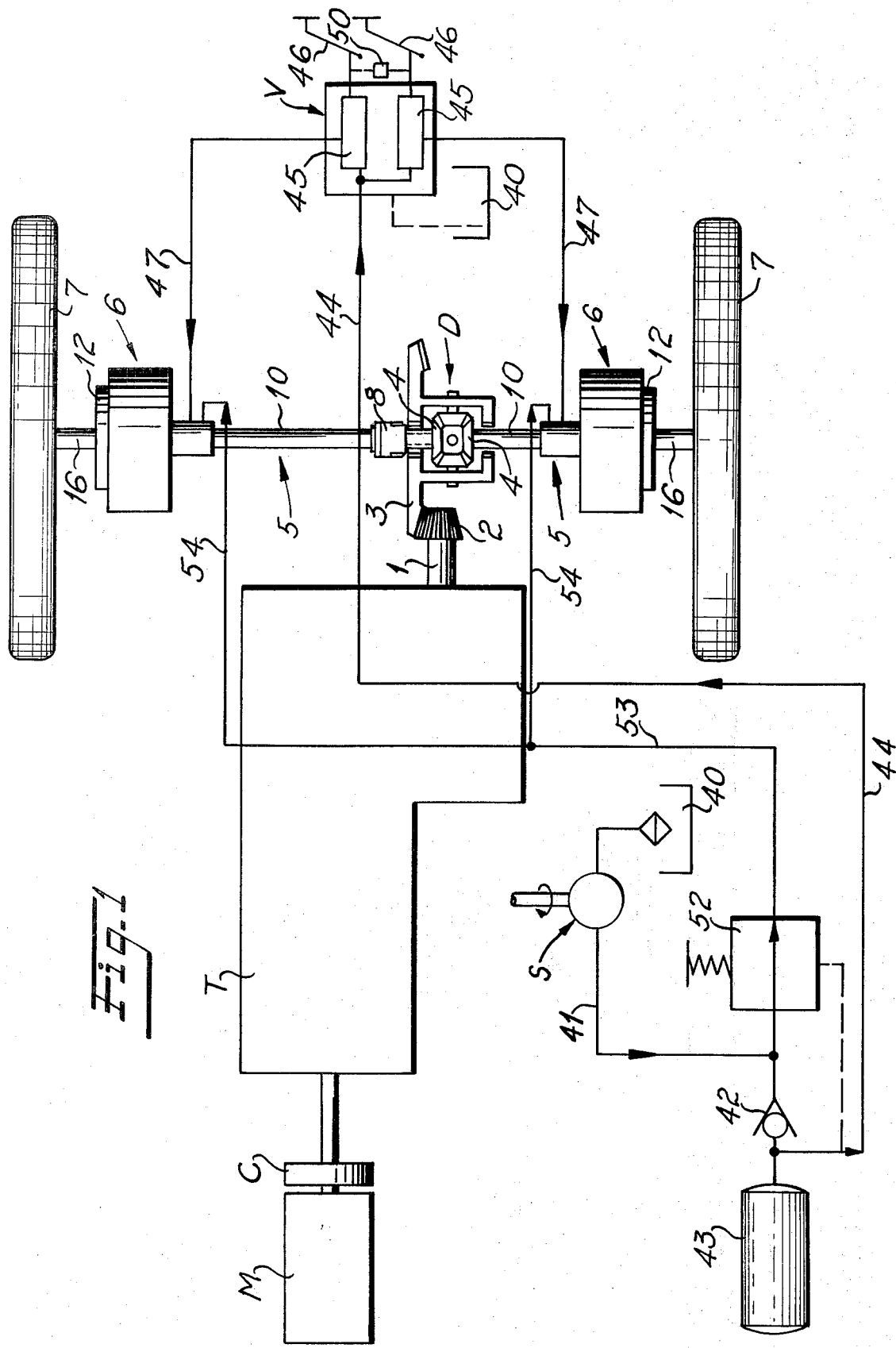
FIG. 1 is a plan view, mainly diagrammatic, showing the invention in a preferred embodiment.

FIG. 1 shows the vehicle and a control system wherein a motor M has its output shaft connected through the usual manually operable normally engaged automotive clutch C to a variable speed transmission T having suitable control means (not shown) for varying the speed of its output shaft 1. A bevel gear 2 on shaft 1 meshes with bevel gear 3 of a conventional differential unit D, the side gears 4 of which are connected through final drive assemblies 5 that include combination transmission and brake units 6 to the ground engaging drive wheels 7. A differential lockout sleeve 8 is slidable on one of the assemblies 5 to directly clutch gear 3 to positively drive both assemblies 5 under certain operational conditions.

In the invention hydraulic fluid is supplied under pressure from a power operated source S such as a delivery pump on the vehicle to provide lubricant to the braking devices and also to a pedal actuated control valve assembly for controlling operation of the braking units 6. Usually the pump at S is driven by the vehicle engine.

Figure 2:
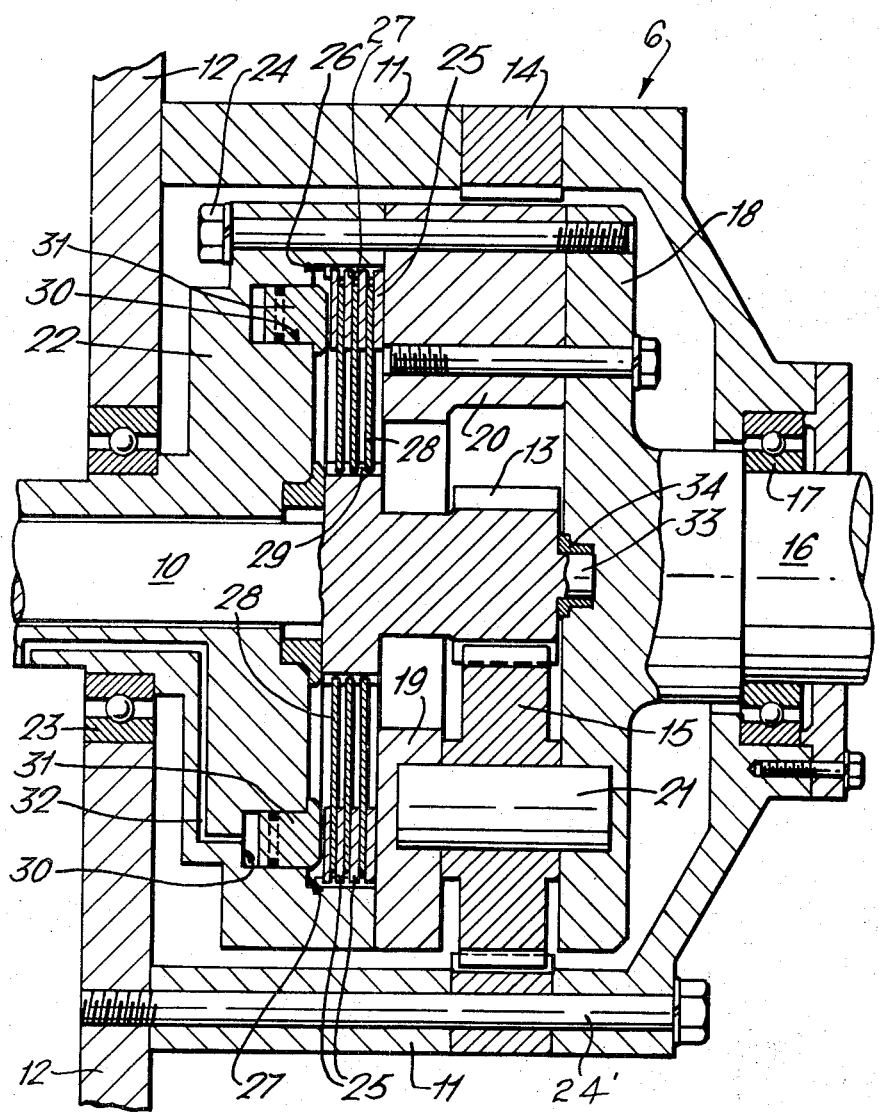
FIG. 2 is an enlarged section showing one of the brake units.
Figure 3:
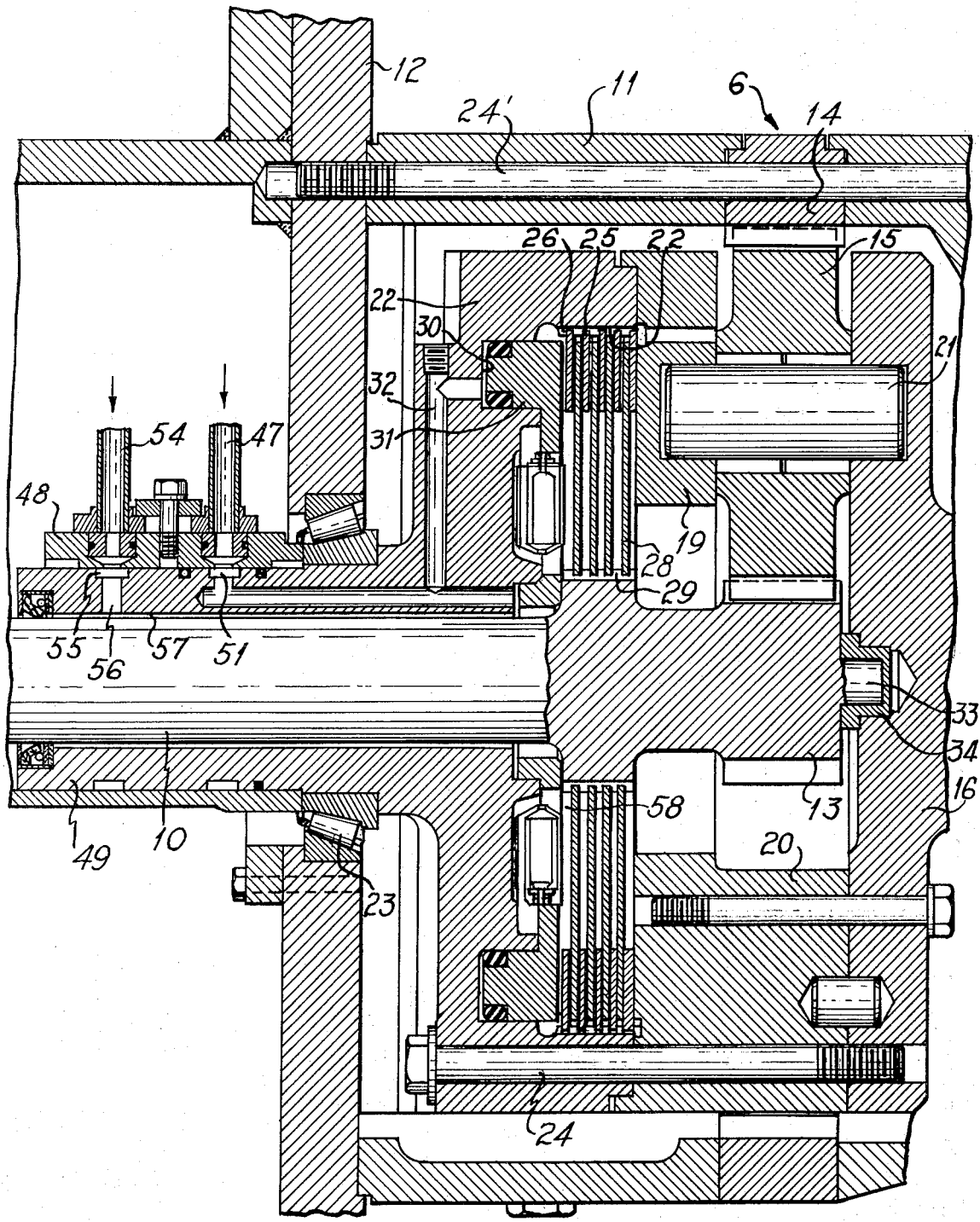
FIG. 3 is an enlarged section further illustrating a brake unit and the passages for introducing control pressure and lubricant.

FIGS. 2 and 3 are sectional views illustrating details of one of the tractor's two substantially identical final drive assemblies 5. There is some difference in detail but similar reference numerals are used for similarly functioning parts. Each of these assemblies is driven from the tractor's differential by a half-shaft 10 which extends laterally of the tractor into a final drive casing 11 secured to a non-rotating part 12 of the tractor's frame. Each half-shaft 10 has formed adjacent its outer end a planetary transmission sunwheel 13 which is surrounded by an annular gear 14 forming part of the final drive casing 11, and a set of three planetary gears 15 constantly meshes with the annular gear 14 and with the sunwheel 13 to form an epicyclic gear train.

An output shaft 16 supported in a bearing 17 housed in the final drive casing 11 carries at its protruding outer end one of the tractor's rear wheels 7 and is provided at its inner end with a circular flange 18 which forms part of a carrier for the set of planetary gears 15. The carrier also includes a circular plate 19 surrounding the outer end of the half-shaft 10 and having three circumferentially spaced axial projections 20 which abut against the flange 18 on the output shaft, and three spindles 21 on which the planetary gears 15 are rotatable, each spindle 21 being mounted centrally of the space between two adjacent projections 20 in two aligned bores formed respectively in the flange 18 and the plate 19.

The half-shaft 10 is supported at its inner end with a bearing fit in the differential gear, and has a spigot 33 at its outer end which is journalled in a plain bearing 34 housed in the inner end of the output shaft 16. A brake housing member 22 surrounding the half-shaft 10 and abutting against the plate 19 is supported in a bearing 23 housed in the part 12. The flange 18 the plate 19 and the brake housing 22 are rigidly clamped together by a set of bolts 24. Casing 11 is secured to frame 12 by a series of bolts 24'. (FIG. 2). The combined planet carrier and braking means unit is journalled in bearings 17 and 23.

A first set of annular friction plates 25 each provided at its outer edge with splines non-rotatably engages internal splines 26 in a bore 27 formed in the brake housing 22 and forms one element of a multi-disc brake. A second set of annular friction plates 28 interleaved with the friction plates 25 and each provided in its bore with internal splines non-rotatably engages splines 29 formed on the half-shaft 10 and forms the other element of the multi-disc brake.

Thus plates 25 rotate with the carrier and plates 28 rotate with the sun gear whereby the sets of plates are carried by respective members of the epicyclic gearing.

An annular recess 30 formed in the inner end of the bore 27 contains an annular piston 31 and is connected by a passage 32 to a hydraulic actuating mechanism on the tractor as will appear. To facilitate steering of the tractor, as will appear, two brake pedals operatively connected to the hydraulic actuating mechanism are provided which can be actuated individually so as to brake either one of the tractor's rear wheels, or locked together in known manner so as to brake both of said wheels simultaneously.

Referring again to FIG. 1, the delivery pump at S is connected at its inlet to a sump or reservoir 40 and its outlet is connected by conduit 41 through a unidirectional check valve 42 that permits storage of hydraulic fluid under pressure in accumulator system 43. The accumulator system 43 is connected by pressure supply conduit 44 to the individual control units 45 of the valve assembly V which are separately mechanically connected to pedals 46, respectively. Pedals 46 may be operated separately as for steering control, or may be locked for movement together as by the device indicated at 50 for simultaneous application of both brakes. The outlet conduits 47 from controls 45 are connected (See FIG. 3) to the passages 32 in the respective final drives. As shown best in FIG. 3, suitable pressure tight seals are provided where each conduit 47 is secured to a stationary manifold 48 surrounding the relatively rotatable hub 49 of the carrier and brake unit with the open end of conduit 47 discharging into an annular recess 51 on the hub that is in communication with the outer end of passage 32.

With further reference to FIGS. 1 and 3, the fluid pressure source is also connected to an unloading valve 52 having a discharge line 53 connected by branch conduit sections 54 to the manifold 48 at each final drive where the end of each conduit section 54 discharges into an annular recess 55 on the carrier hub 49. Recess 55 is connected by one or more radial ports 56 to the annular bearing space 57 between shaft 10 and hub 49, which annular space communicates at its inner end with the brake disc space indicated at 58. In this manner hydraulic oil which serves as a lubricant during non-braking conditions is supplied continuously into the brake disc space while the vehicle engine drives the pump at S.

Thus whenever the vehicle engine is running hydraulic oil is pumped into the brake disc spaces as shown in FIGS. 2 and 3. Actuation of either or both pedals 46 will effect displacement of the piston or pistons 31 to effect desired braking action by the higher hydraulic pressures generated at the master cylinders and transmitted through passages 32 in the respective final drives.

Actuation of one of the brake pedals 46 causes the associated annular piston 31 to force the two sets of friction plates 25 and 28 into engagement with one another. This prevents relative rotation of the sunwheel 13 and the carrier and brake housing 18, 19, 22 which in turn prevents rotation of the planetary gears 15 about their own axes. As the annular gear 14 is rotationally fixed, the half-shaft 10 and associated rear wheel 7 are accordingly held against rotation.

Due to both of the co-acting braking element sets being supported in bearings the vibrations set up within the multi-disc brake on its application which comprise minute vibratory movements in the plane of rotation, do not induce corresponding vibrations in the final drive casing as said vibratory movements cannot be transmitted by the bearings. Thus the need for a special oil containing an anti-vibration additive is avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a drive control system for a vehicle having an engine and variable speed transmission assembly and a final drive assembly driven therefrom at each of a plurality of ground engaging wheels, each of said final drive assemblies comprising a planetary gear transmission disposed in a casing rigid with the vehicle frame, said planetary gear transmission comprising power driven input shaft means carrying a sun gear, a planet gear carrier mounted for rotation in said casing and supporting a plurality of rotatable planet gears, output shaft means rotatable with said carrier and operably connected to the associated wheel and a ring gear rigid with the casing meshed with said planet gears, and brake means within said casing comprising two relatively movable parts, one of which is rotatable with the sun gear and the other of which is rotatable with the carrier, and control means for selectively urging said parts into locking frictional engagement to thereby lock said input and output shaft means against rotation during operation.

2. In the drive control system defined in claim 1, said input and output shaft means being coaxial shafts.

3. In the drive control system defined in claim 2, said brake means comprising a housing member rigid with said carrier, said movable brake parts comprising sets of plates interleaved with one another to form multi-disc brake means disposed in a brake disc space surrounding a portion of said input shaft adjacent the sun gear, with one set of plates slidably non-rotatably mounted on said input shaft and the other set of plates slidably rotatably mounted on said brake housing member, and actuator means in said brake housing member operable to urge said leaves axially into locking relationship.

4. In the drive control system defined in claim 3, said actuator means comprising a piston slidable in a cylinder axially of said shafts, and said control means comprising a manually operable hydraulic system connected to said cylinder.

5. In the drive control system defined in claim 1, said control means comprising means for selectively actuating one or the other of said brake means individually as for steering or for actuating both brake means together as for roadway travel.

6. In the drive control system defined in claim 1, said input shafts being connected to opposite sides of a power driven differential mechanism in the vehicle and there being a differential lockout for direct drive of said input shafts from the engine and transmission assembly.

7. In the drive control system defined in claim 4, means for supplying hydraulic fluid under pressure as a lubricant into said space while the vehicle enging is running.

8. In the drive control system defined in claim 7, said combined carrier and brake housing member being rotatably supported in bearings at opposite ends of said casing, and there being a manifold at one end of the casing rotatably supporting a hollow hub on said brake housing member that extends through one of said bearings in surrounding relation to the associated input shaft, said lubricant being supplied through aid manifold and the bearing space between said hub and the input shaft into said brake disc space and said hydraulic fluid being supplied through said manifold and passage means in said hub to said space.

9. In the drive control system defined in claim 7, said hydraulic system providing a common source of hydraulic liquid as said lubricant and said hydraulic fluid for said piston cylinder.

10. In the drive control system defined in claim 4, said cylinder being annular and said piston being an annulus adapted to axially engage an adjacent plate of one of said sets during braking.

* * * * *